US008345627B2

(12) United States Patent
Lott

(10) Patent No.: US 8,345,627 B2
(45) Date of Patent: Jan. 1, 2013

(54) FAST SYNCHRONISED TRANSPARENT HANDOVER METHOD AND SYSTEM

(75) Inventor: Matthias Lott, Planegg (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 1069 days.

(21) Appl. No.: 11/887,000

(22) PCT Filed: Mar. 21, 2006

(86) PCT No.: PCT/EP2006/060912
§ 371 (c)(1),
(2), (4) Date: Oct. 31, 2008

(87) PCT Pub. No.: WO2006/100240
PCT Pub. Date: Sep. 28, 2006

(65) Prior Publication Data
US 2009/0232089 A1    Sep. 17, 2009

(30) Foreign Application Priority Data
Mar. 24, 2005   (EP) ..................... 05006596

(51) Int. Cl.
*H04L 12/26* (2006.01)
*H04W 36/00* (2009.01)
(52) U.S. Cl. ..................... 370/331; 455/437
(58) Field of Classification Search ............ None
See application file for complete search history.

(56) References Cited

U.S. PATENT DOCUMENTS

| | | | |
|---|---|---|---|
| 6,363,252 B1* | 3/2002 | Hamalainen et al. | 455/436 |
| 6,496,551 B1* | 12/2002 | Dam et al. | 375/347 |
| 2001/0047424 A1* | 11/2001 | Alastalo et al. | 709/236 |
| 2002/0009070 A1* | 1/2002 | Lindsay et al. | 370/347 |
| 2004/0063430 A1* | 4/2004 | Cave et al. | 455/436 |
| 2004/0121771 A1* | 6/2004 | Song et al. | 455/436 |
| 2004/0185853 A1 | 9/2004 | Kim et al. | |
| 2004/0224691 A1* | 11/2004 | Hadad | 455/442 |
| 2005/0059437 A1* | 3/2005 | Son et al. | 455/574 |
| 2005/0111429 A1* | 5/2005 | Kim et al. | 370/344 |
| 2005/0117539 A1* | 6/2005 | Song et al. | 370/328 |
| 2005/0195791 A1* | 9/2005 | Sung et al. | 370/342 |

FOREIGN PATENT DOCUMENTS

WO    2004/079949    9/2004

OTHER PUBLICATIONS

I. Kitroser, "Handoff Draft", IEEE 802.16, Mar. 13, 2003, pp. 1-21, XP002340194, http://www.ieee802.org/16/tge/contrib/C80216e-03_20r1.pdf.

* cited by examiner

*Primary Examiner* — Gregory Sefcheck
*Assistant Examiner* — Ashley Shivers
(74) *Attorney, Agent, or Firm* — Staas & Halsey LLP

(57) ABSTRACT

A mobile communications system (100), comprising at least one mobile terminal (200), a plurality of base stations (300a-300e), at least one central entity (400) adapted to manage said plurality of base stations, adapted to perform a handover, wherein: —said mobile terminal (200) is adapted to transmit a handover request message in a pre-defined slot requesting a new point of attachment; —said plurality of base stations (300a-300e) are adapted to receive said handover request message and further adapted to determine which one of said plurality of base stations (300a-300e) is to become said new point of attachment; —a base station (300a) arranged to become said new point of attachment is further adapted to transmit a handover response message to said mobile terminal (200); —said mobile terminal (200) is adapted to receive said handover response message and to change its point of attachment.

29 Claims, 3 Drawing Sheets

FAST SYNCHRONISED TRANSPARENT HANDOVER METHOD AND SYSTEM

CROSS REFERENCE TO RELATED APPLICATIONS

This application is based on and hereby claims priority to International Application No. PCT/EP2006/060912 filed on Mar. 21, 2006 and European Application No. EP05006596 filed on Mar. 24, 2005, the contents of which are hereby incorporated by reference.

FIELD OF THE INVENTION

The invention is used in mobile communications networks to ensure that handovers are performed quickly and transparently, without causing loss of service and without wasting channel resources.

SUMMARY OF THE INVENTION

Handover HO is a very important function in existing mobile communications systems whereby a mobile terminal MT changes its point of attachment AP. This is also an important function in mobile communications systems, which can be characterized by multi-hop communication and use orthogonal frequency multiple access OFDMA. A skilled person in the art will appreciate that other terms can be used instead of "point of attachment", such as "point of access", "base station", "point of network connection", "relay node" or the like. All such terms are equivalent and interchangeable.

If the change of the point of attachment happens with a short interruption of service, the handover is called hard handover. The old link is released and a new one created with the new base station BS, respectively access point AP.

During a seamless handover the MT changes its point of attachment between cells by using the old and the new connection simultaneously with only one of them being active. Data is broadcast via both links. The old link stays active as long as the new path is activated through a switching action in the network, based on the quality perception of the mobile device.

A soft handover allows a transient phase during which multiple links can be used for communication simultaneously with all of them being active.

This concept—which has the advantage that if one link fails the MT can communicate using the remaining links—is referred to as simulcasting.

In comparison to the hard handover the seamless and soft approaches are more reliable since the old link is released after a new one has been established.

However the utilization of two links during the handover phase degrades the number of available channels, which has a negative impact on the number of users that can be carried. Hence, an efficient handover should support a change of the AP without service interruption and a minimum of resource utilization.

The time needed by the system to set up the path is referred to as the network response time. If the old radio link is broken up before the network completes the setup, the connection is dropped even if there are channels available in the cell. To make sure the interruption is as short as possible the path to the new BS can be established in advance through the network before the device changes over. In the case of hard handover, switching to the new path and rerouting of the transmitted information are performed simultaneously. But at any one time there is only a single connection to a BS per MT. Hence, no scarce resources are wasted and the data overhead is minimized since data does not have to be duplicated.

Nevertheless, excessive service interruption when changing over would result in a dropped call, which has to be avoided.

A need therefore exists for a technique that supports an efficient fast handover between mobile terminals MTs and access points APs without excessive service interruption to users and at the same time to avoid wasting available transmit resources, i.e. channels.

With the present invention the above mentioned problems are resolved. The proposed technique provides an efficient fast handover, which does not cause excessive service interruption and does not waist the resources available, in a wireless radio environment and can be implemented in all existing wireless systems without incurring increased extra costs.

The technique is achieved by the teachings contained in the independent claims.

Said independent method performs a handover in a wireless communications system, said system comprising at least one mobile terminal, a plurality of base stations at least one central entity managing said plurality of base stations, whereby said method comprises the steps of:
    said mobile terminal transmits a handover request message in a pre-assigned slot, requesting a new point of attachment;
    said plurality of base stations upon receiving said handover request message determine which one of said plurality of base stations is to become said new point of attachment;
    a base station upon completion of said determination on becoming said new point of attachment transmitting a handover response message to said mobile terminal;
    said mobile terminal upon reception of said handover response message changing its point of attachment.

Said independent mobile communications system, comprises at least one mobile terminal, a plurality of base stations, at least one central entity adapted to manage said plurality of base stations, adapted to perform a handover, wherein:
    said mobile terminal is adapted to transmit a handover request message in a pre-defined slot requesting a new point of attachment;
    said plurality of base stations are adapted to receive said handover request message and further adapted to determine which one of said plurality of base stations is to become said new point of attachment;
    a base station arranged to become said new point of attachment is further adapted to transmit a handover response message to said mobile terminal;
    said mobile terminal is adapted to receive said handover response message and to change its point of attachment.

Further advantages can be seen in the dependent claims, whereby the transmission of the handover request message is either a broadcast or multicast transmission. Additionally, it is further advantageous that the transmission is done on a plurality of sub-carriers SCs, and that the sub-carriers are synchronized. Furthermore, it is advantageous that the pre-assigned slot is positioned towards the end of a transmitted frame. Additionally, it is advantageous that the pre-assigned slot is positioned after a slot used for random access.

SHORT DESCRIPTION OF THE DRAWINGS

The present invention will become more fully apparent from the detailed description given hereinbelow and the accompanying drawings which are given by way of illustration only, and thus are not limitative of the present invention, and wherein.

DETAILED DESCRIPTION OF THE INVENTION

Figure 1:
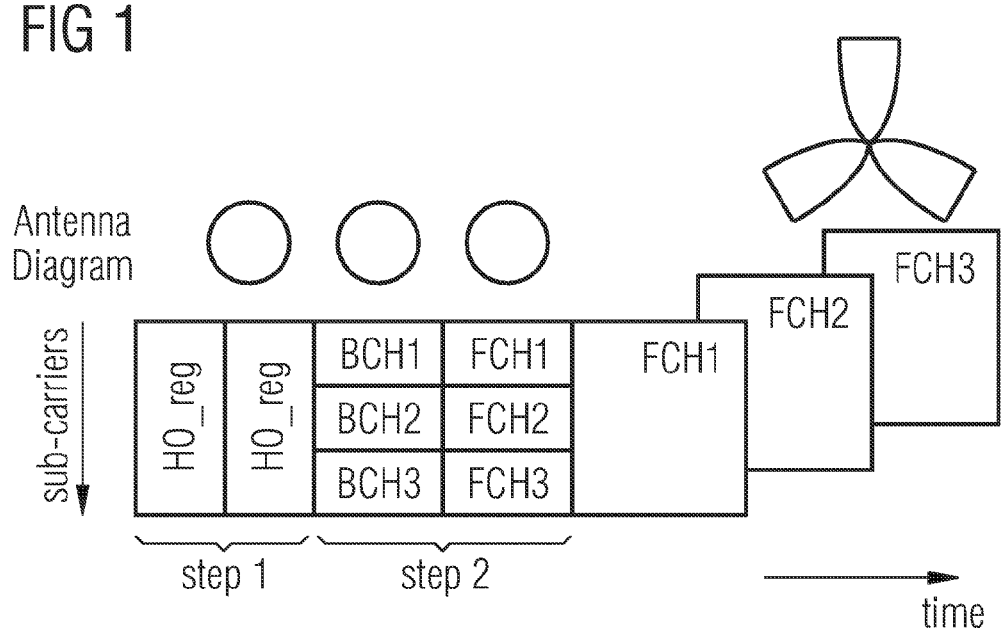
FIG. 1, shows the frame structure for synchronized AP-oriented fast, transparent HO procedure.

Within the field of mobile communications, different handover schemes have been proposed in order to resolve handover issues.

Predictive Rerouting Handover

The predictive rerouting handover scheme predicts the new potential base stations BSs based on the information stored in the location management system. These BSs then join a group of BSs that form a multicast tree, which is set up initially when a mobile device registers with the network. The group is updated as the device moves through the coverage region of the network. In this group, the serving BS is called active and the remaining BSs inactive. A handover is triggered when an MT fails to receive the beacon signal of its serving BS several times. When this happens the new BS becomes active and updates the multicast tree. The multicast tree can be used in two different ways to send data packets: either packets are only sent to the active BS or to the whole group of BSs. In the latter case the BSs which are not active buffer the packets and drop them when they are outdated. In both cases the advantage of the scheme is that a link is already established before the handover occurs. Since the tree is updated after the handover response the aim of this scheme is to minimize handover latency.

A negative aspect of the scheme however is the signaling overhead involved in updating the multicast tree, as well as the data overhead in case duplicate data packets are sent to all members. This scheme can be applied for the intelligent delivery of packets to different BSs in advance of the handover performed. However, the service interruption on the wireless link is not taken into account in this approach.

Reservation Handover

Reservation handover schemes are based on the idea to prioritize handover requests over new calls. This is achieved by reserving resources exclusively for handover requests, which can be done in a predictive or non-predictive manner. While predictive reservation schemes reserve channels at potential BSs prior to the arrival of MTs based on future path prediction using probability values and mobility pattern on individual MTs, non-predictive reservation schemes (guard channel schemes) reserve a set of channels solely for handover requests. By doing this, handover requests and new calls are allowed to compete for the remaining channels. Guard channel GC schemes can be split up into static and dynamic reservation types depending on whether the set of reserved channels is fixed or varies according to the traffic conditions.

Static reservation schemes use a threshold in each cell. If the number of channels currently being used is below that threshold, both new calls and handover request are accepted. If the number of used channels exceeds the set threshold, incoming calls are blocked and only handover request are served. The main drawback of this approach is that the threshold value must be chosen carefully otherwise the available spectrum of the system might be under utilised and hence the total amount of carried traffic limited.

Dynamic reservation schemes try to avoid the problem by varying the set of reserved channels according to the traffic condition and the position of users. This has the advantage that the scheme overall results in a better utilization of the available frequency spectrum. In order to allow dynamic adjustments, some method for monitoring the traffic situation is required, which results in signaling and computational overhead. Nevertheless, even with dynamic reservation schemes resources are allocated in advance for potential terminals willing to handover and therefore, require resources that are not used with some probability and are potential sources for wasting capacity. Even if the resources are shared for all potential handover candidates there is a probability of collisions that have to be resolved and this would mean that a considerable time would be used in resolving the collisions, thus further reducing the efficiency of the scheme.

Channel Carrying Handover

In the channel carrying handover scheme if there are no channels in the new BS, the MT is allowed to keep on using its current channel and carry it into the new cell. Communication is now maintained via the BS in the new cell using the old channel. By doing this, the scheme ensures that an ongoing call is not forcibly terminated due to an unavailability of channels. Since channels do not need to be reserved in advance the efficiency of the system is increased. This is achieved without any requirement of global communication. However, carrying a channel into a new cell results in an increased signaling overhead due to communication with the neighboring cell to negotiate the channel use.

Channel Sub-Rating Handover

The channel sub-rating scheme is able to carry more offered load than any other scheme. It achieves this by creating a new channel on a blocked port for a handover attempt by sub-rating an existing connection. Sub-rating means that in the case of non-availability of channels a full rate channel is temporarily divided into two channels at half the original rate. By doing this one half can be used to serve the existing connection and the other to serve the handover request so that the forced termination of calls can be virtually eliminated. However this enhancement is achieved at the expense of a degradation of quality of service QoS, which makes the scheme only suitable for low bandwidth requirements such as voice transmission. Additionally, the target BS has to be determined and this also requires considerable resources and time. Furthermore, additional signaling is needed between the BS and MT to agree on the channel to be used.

The invention proposes a novel, improved synchronized access point AP or relay node RN that controls fast and transparent handovers HOs in multi-hop environments.

The handover HO is described by the following innovative features:

Synchronization:

All MTs in neighbouring cells that want to HO send in pre-assigned slots a handover request. Since it is foreseen that all APs/RNs have to receive the request this slot should be synchronized in all neighboring cells. Advantageously, the MTs transmit at the same time their request on different sub-carriers in a time division multiple access/orthogonal frequency multiple access TDMA/OFDMA based system. Different alternative possibilities exist for the synchronised simultaneously transmission of the HO request to several APs/RNs.

1. AP/RN-Specific Sub-Carriers Selection in OFDMA-Based Systems.

The different OFDMA sub-carriers are shared between different neighbored APs/RNs. In the synchronized initial ranging (random access) slots, all MTs that intend to HO can send an HO request that contains only their MAC ID. For that purpose, only those sub-carriers of the AP/RN they are currently associated with are used. Hence, neighbouring APs/RNs have different sub-carriers related to them for their MTs to transmit their HO requests. Collisions can happen only within the cell. The collisions can be resolved by means of, back-off procedures or splitting approaches. Different to the selection of the sub-carriers of the AP/RN the MT is associated with, the MT can select also those sub-carriers of the AP/RN it has received with the strongest signal power. By means of this selection closed-loop link-information can be exchanged, since the AP/RN knows which link in the downlink is the strongest/best, which has not necessarily to be the same as for the uplink, which is discovered by the HO request message.

2. Random Orthogonal Sub-Carrier Selection in OFDMA-Based Systems.

Similar to the previous approach, all MTs select a specific set of sub-carriers within the OFDMA-based system. The sets are pre-specified and orthogonal. However, the stations randomly select a set and are not restricted to the set that is offered by its AP/RN.

3. Random Non-Orthogonal Sub-Carrier Selection in OFDMA-Based Systems.

Similar to the random orthogonal sub-carrier allocation in OFDMA, the MTs randomly select a specific number of sub-carriers. However, it is not required that these sub-carriers are orthogonal anymore. They can partly overlap. With respective coding the transmitted MT MAC ID can be retrieved even though some sub-carriers might be corrupted.

4. Spreading in CDMA-Based Systems.

All MTs transmit at the same time use different spreading codes for that purpose. The receiver (AP or RN) has to de-correlate and cancel the interference of other MTs transmitted simultaneously. Joint detection is the preferred approach to achieve this.

5. Combination of Spreading and Random Sub-Carrier Selection In Multi-Carrier Carrier Division Multiple Access/Frequency Division Multiple Access MC-CDMA/FDMA Based systems.

In general, all MTs that want to perform a handover HO, for example due to a bad connection, transmit at the same the HO requests that are received by all neighbouring APs/RNs.

Additionally, in the case of a wireless communications network using OFDMA in combination with the IEEE 802.16e (WiMAX, Worldwide Interoperability for Microwave Access) standard, the AP takes over the control of the MT seamlessly (transparent) by announcing respective transmission opportunities in the Uplink-MAP UL-MAP. The UL-MAP is a directory of slot locations within the uplink subframe. In this case the HO can be performed without the explicit handover_response HO_RSP message as specified in the standard. Alternatively, the HO_RSP message is embedded in the Downlink DL burst 1, whereby each AP uses disjoint sub-carriers. Hence, the MT becomes aware of the new AP it is connected to in the next frame without disconnecting from the serving AP, which operates on other sub-carriers in the same frequency band of the OFDMA system.

AP/RN Controlled:

The APs/RNs detect and determine the conditions of the link and decide on the HO. This result in an MT initiated and supported and AP/RN controlled HO. With the HO request by the MT the HO is initiated and based on the link conditions the best suited AP/RN will become the target AP/RN and new serving point of attachment to the Radio Access Network RAN. By sending out the HO request and providing the AP/RN with means to measure the link quality the decision process at the AP/RN is supported.

If the link conditions are bad, then the MT will initiate a handover HO, by transmitting a HO request. However, it is also possible that the AP/RN requests the MT to send out an HO request so that neighbouring APs/RNs can measure and decide on the best uplink, and hence, the HO is only supported by the MT.

Traditionally, the MT associates with a potential AP/RN and exchanges messages so that the AP/RN becomes aware of the uplink radio condition. Contrary to common HO procedures, a multicast of the HO request is sent out by an MT over the wireless link to several APs/RNs in the neighbourhood simultaneously. In order to achieve an efficient transmission of the HO request, orthogonal frequency multiple access OFDMA is used for this purpose.

The HO request transmitted comprises the MAC ID of the requesting MT so that the AP/RN can identify and address this MT in the next frame via the new AP/RN.

MT Controlled, Distributed Decision:

The MT detects and determines the conditions of the link based on the HO response and decides on the HO. This results in an MT initiated and controlled HO. With the HO request by the MT the HO is initiated and based on the downlink conditions the best suited AP/RN will become the target AP/RN and new serving point of attachment to the Radio Access Network RAN. By sending out the HO response messages and providing the MT with means to measure the link quality on the downlink the decision process at the MT is established.

In this alternative procedure, the MT will transmit a handover request message in a pre-assigned slot, requesting a new point of attachment. As this handover request message is broadcasted all base stations in the vicinity of the mobile terminal will receive the message. Each will then determine whether they can become the new point of attachment. Once they have completed their determinations, they will transmit a handover response message to the mobile terminal. The mobile terminal upon receiving on or more of these response messages will determine which is the best one for acting as a new point of attachment. For example the message received with the strongest power would indicate a base station that is close by and should become the new point of attachment. Other ways for a mobile terminal to determine its new point of attachment are possible.

In this way, the mobile terminal determines the new point of attachment, instead of the base stations performing the determination and simply indicating to the mobile terminal the new point of attachment.

Transparent HO:

The HO itself can be performed almost transparently for the MT. In case the AP/RN or a central entity that is attached to the respective APs/RNs decides on the new serving entity, the MT is not directly involved in the selection and HO process. Moreover, the new AP/RN will inform the MT about the new point of attachment. This is realised with the following approach: All APs/RNs in the neighbourhood use a common frequency band for broadcast information and signaling information relevant for all MTs in their coverage range. For that purpose OFDMA is used and disjoint sub-carriers are allocated to the different APs/RNs, respectively.

The APs/RNs transmit simultaneously via broadcast control channels (BCHs) on different sub-carriers. This allows for the detection of candidate APs/RNs in the same frequency band of operation whereby all BCHs are received at the MT for the purpose of link quality measurements.

In addition to this however, the simultaneous transmissions can be used for switching from one AP/RN to another without changing the frequency band but only getting addressed in the next frame by a new AP/RN. Depending on the sub-carriers where the MT receives a respective association message, which can be interpreted as an HO response to the previous request message, a corresponding AP/RN is associated to and will be the new AP/RN the MT will get served in the next frame. Since all BCHs are received at the MT, the additional decoding of the association/HO response message can be easily incorporated.

Multi-Hop Scenario:

The proposed synchronized, transparent, fast HO is also suitable for a multi-hop environment comprising one AP and one or more synchronized relay nodes (RNs). It is also suitable for cellular-like deployments, too, where context transfer and coordination between APs becomes possible. A typical multi-hop deployment concept for Manhattan-like scenarios, whereby a mobile communications network is located within a region which comprises of tall buildings and streets that intersect at right angles, comprises one AP and at least four associated RNs covering the different streets the AP has to supply. Since the AP controls the resources of the associated RNs (and can decide on the used sub-carriers at the AP and RN) and all RNs are in radio range of the AP, they are most probably synchronized to the AP. In this deployment the HO from one AP to one RN and from one RN to another RN or the AP can be performed almost transparently for the MT. All AP/RNs share the same frequency band and the point of attachment for the MT, whether directly to the AP or via relaying through a RN is selected via the multi-hop network and is primarily based on the uplink radio conditions and available radio resources managed by the AP or related central instance. Most probably, the AP/RN closest to the MT (with the strongest signal) will decide to take over the MT.

In the following the protocol for the synchronized, transparent, fast HO is described:

1. MT sends HO offer

In the first step the MT sends an HO request via multicast to neighboring APs/RNs. This is done in one or more synchronized slots at the end of the frame, most probably after slots used for random access, see step 1 in FIG. 1. The transmission can be initiated because of bad link conditions or because the MT has been requested to by the serving AP/RN.

2. Response of one AP/RN

Based on the HO request, one AP/RN answers with an HO response that corresponds to the MAC ID of the MT. The HO response can be transmitted in the broadcast control channel (BCH) or in the frame control channel (FCH), see step 2 in FIG. 1. Thus, each BCH or FCH, respectively, has a list of MAC IDs in its HO response message of MTs they will serve in the next frame.

3. Assignment to new AP/RN

The MT will automatically and transparently be assigned to that AP/RN that has sent out the list with its MAC ID. The logical assignment can be realized by the respective sub-carriers used by that AP/RN. It is therefore possible that an MT is synchronized and assigned to a new AP/RN without knowing the new AP/RN ID. A change of the point of attachment is established by a change of sub-carriers only. The following assignment of resources will be signaled over the respective sub-carriers. However, if the MT cannot find its MAC ID in the corresponding HO response message, it will be automatically be assigned to the currently serving AP/MT.

The simultaneous transmission of BCHs of neighboring APs/RNs on different sub-carriers is supported and can be easily realized in an OFDMA-based system. The HO request and BCHs are transmitted with omni-directional antennas since these messages have broadcast character. The FCH and following data exchange can be realized with omni-directional antennas on different frequency channels (sub-carriers) or via directional antennas, respectively beam-forming, as indicated in FIG. 1.

In the following the advantages of the new synchronized, fast, transparent, AP/RN-controlled handover are listed.

Efficient and Fast HO:

One HO request is addressed to all APs/RNs in the radio range. The best suited AP/RN will be immediately selected in the next frame as candidate AP/RN. This makes a fast connection setup/re-establishment, even after a long inactive period (idle time) possible. Besides this, a very efficient request is realized since with one message only all reachable APs/RNs are addressed. The fast HO (one frame only) minimizes packet losses and delays during a HO (support of seamless handover). Very small cell sizes are supported with frequent HOs because of the efficient and fast connection setup in the new cell.

Moreover, the MT is already known and registered with the new AP/RN due to the HO request and hence, the HO can be quickly realized.

Exploitation of Diversity and Capture:

Because of the position of the HO request at the end of the frame before the synchronized BCH, the HO request happens always at same position in the frame though different lengths of BCHs and FCHs are supported. This allows all stations to transmit at same time, and there is no way to distinguish between APs/RNs. All APs/RNS appear to be the same to the MT and exploitation of diversity and capture at the APs/RNs becomes possible.

Easy Synchronization with Fast HO Support:

All APs/RNs operate with the same frame length. This makes it easier for the HO of MTs from one AP/RN to another, since efforts in synchronization are minimised.

Support of HO Preparation/Planned HO:

The HO requests received at the APs/RNs can be seen as some kind of "trigger" e.g. information from the MT or from the network that a HO is imminent, in order that action can be taken in advance of the actual HO (planned HO). The HO might be initiated/completed not immediately in the next frame but also possibly in two or three frames later as long as the current radio conditions are acceptable. The HO preparation, respectively planned HO makes it possible to transfer contexts (QoS, security, header compression state, link layer states) but also any buffered packets (tunneling) from the old to the new AP/RN to support seamless and loss-less HOs. Instead of macro-diversity, the new proposed HO scheme does not waste capacity since no data packets have to be transmitted simultaneously from more than one AP/RN, but the best suited AP/RN has been selected based on the previously measured link conditions via the HO request.

Separation of Traffic:

All APs/RNs gather at the same time information about MTs in their detection range. Therefore, the HO request phases and the normal data transmission phases are clearly separated. No collisions with normal data transmission occur and clear assignment of control information across different APs/RNs is possible.

Transparent Resource Allocation:

As explained above, the logical assignment of an MT to an arbitrary AP/RN can be realized by the respective sub-carriers used by that AP/RN. A change of the point of attachment is established by a change of sub-carriers only. The following assignment of resources will be signaled over the respective sub-carriers and supports any possible resource allocation strategies, and hence, a high flexibility.

Multi-Hop Environment:

It can be understood that most probably the AP/RN closest to the MT, with the strongest received signal, will decide to take over the MT. However, in a multi-hop deployment scenario even the AP with worse radio conditions than an RN might end up in a better overall end-to-end capacity, since all traffic directed to the RN with a final destination to the AP has to be relayed and relaying requires additional resources. With the new approach the AP/RN decides about the new point of attachment and, hence, can take into account this specific condition in the final HO decision.

Furthermore, the novel technique for a fast handover is highly adapted to wireless communications networks with very small cell sizes, frequent handovers, and multi-hop communication via relay nodes, as well as to networks that. Additionally, it can be applied also to any wireless networks that support synchronized uplink transmission.

Figure 2:
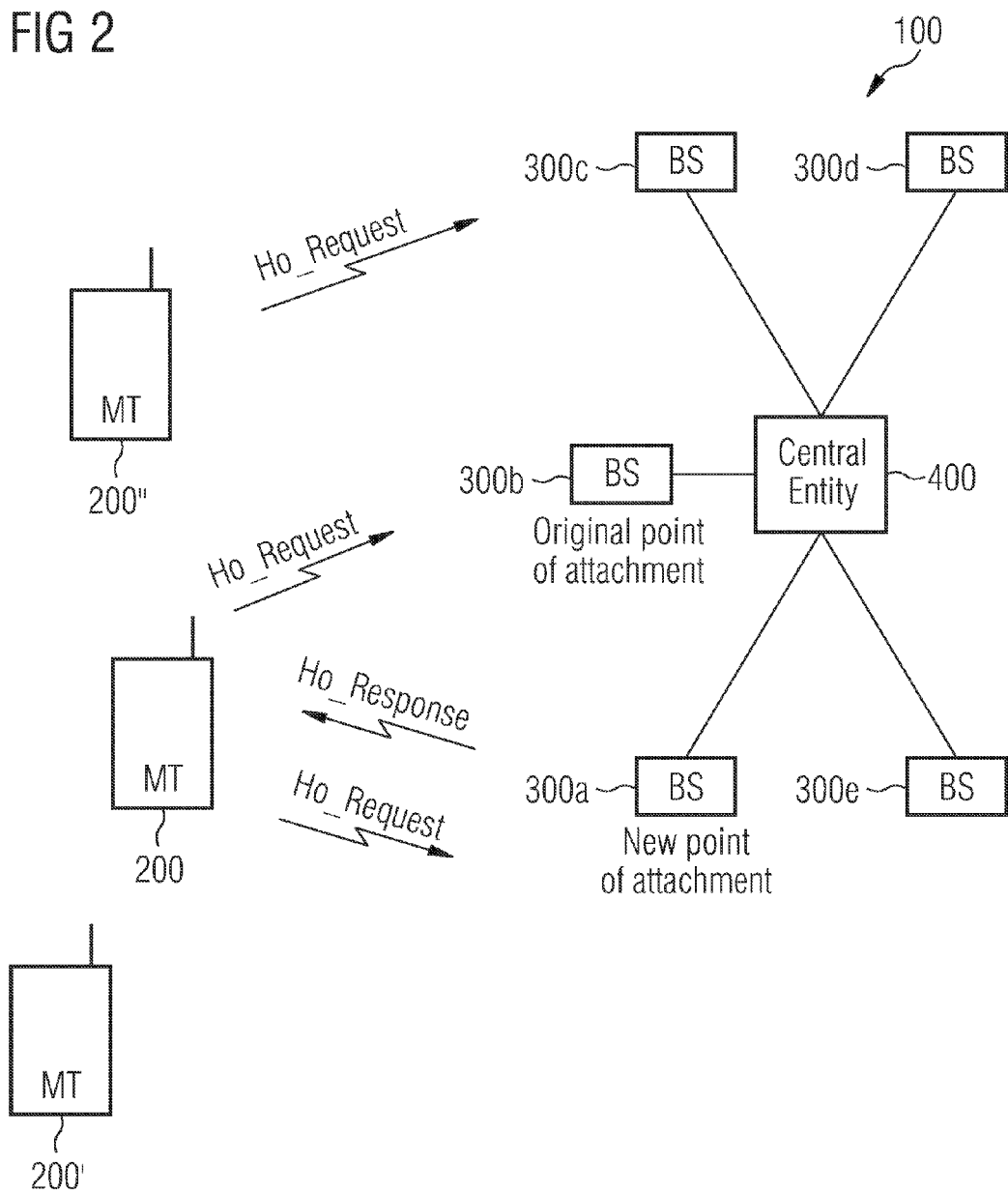
FIG. 2, shows a mobile communications network where the invention is applied.
Figure 3:
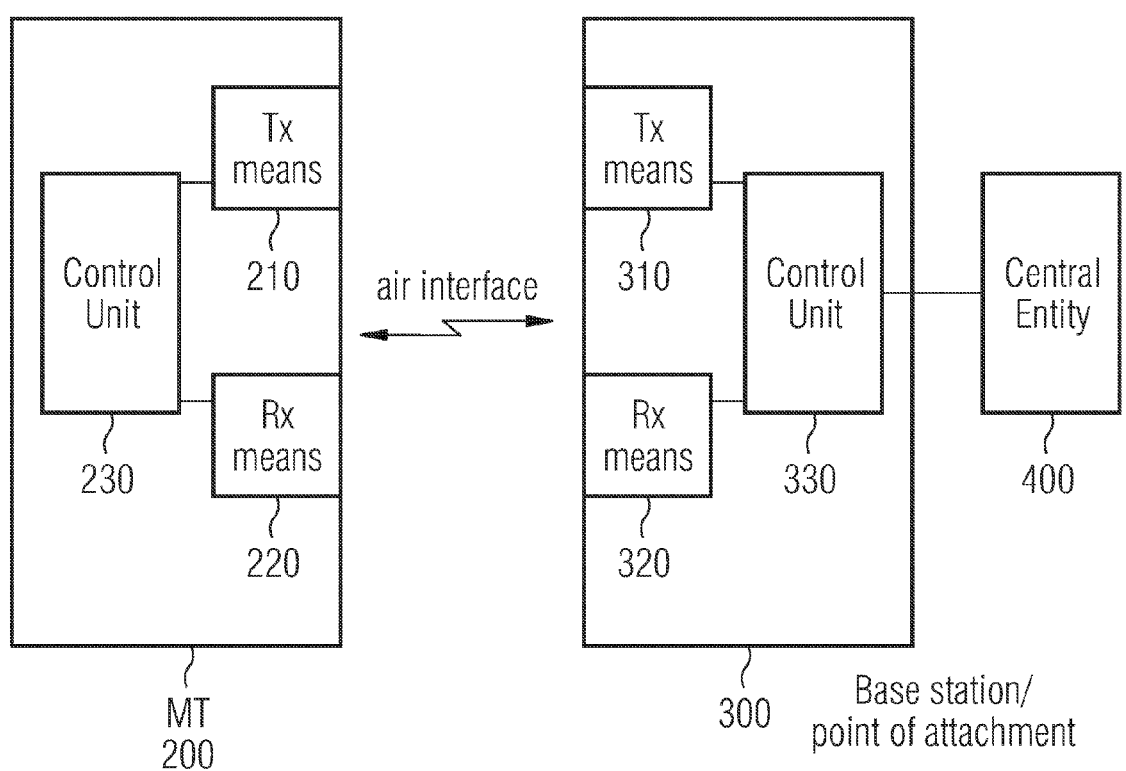
FIG. 3, shows a detailed view of the blocks that comprise a mobile terminal and a base station in the proposed invention.

To further illustrate the invention, FIG. 2 shows a typical mobile communications network 100, which comprises of a mobile terminal 200, base stations 300a-300e and a central entity 400 that manages the base stations. Although only one mobile terminal 200, one central entity 400 and five base stations 300a-300e are shown in FIG. 2, a person skilled in the art will appreciate that a typical mobile network will include a number of mobile terminals, base stations and central entities not shown here. FIG. 3 shows a more detailed view of the different blocks that comprise a mobile terminal and a base station in the proposed invention.

Mobile terminal 200 initiates a handover request by transmitting a HO_request message. This message is broadcast in a predefined slot over a plurality of different synchronised sub-carriers. The mobile terminal 200 comprises of a control unit 230 that is connected to transmission means 210 that adapted to transmit a HO_request message and receiving means 220 adapted to receive any messages that are transmitted to the mobile terminal 200. The HO_request message is received by the base stations 300a-300e that are in the neighbourhood of mobile station 200. A base station 300 comprises of transmission 310 and receiving 320 means respectively, which in turn are connected to a control unit 330. The receiving means 320 are adapted to receive messages and to pass them on to the control unit 330. The control unit 330 is adapted to determine upon reception of a HO_request message whether the base station 300 in question is to become the new point of attachment. Alternatively the control unit 330 is adapted to pass on the HO-request message to a central entity 400 which is adapted to determine which base station 300a-300e is to become the new point of attachment. The HO_request message that is broadcast contains the MAC ID of the mobile terminal 200. Once the determination of the handover has been executed a HO_response message is transmitted by the transmission means 310 in a broadcast or frame control channel. The mobile terminal upon receiving the HO_response at the receive means 220 will then pass it on to the control unit 230. The control unit is adapted to check whether the HO_response message containing the MAC ID of the mobile terminal 200. If the MAC ID is contained then the control unit 230 is adapted to plan a handover to the new point of attachment. If the MAC ID is not contained then the control unit is adapted to maintain its original point of attachment. The base stations 300a-300e that are neighbours are adapted use a common frequency band for broadcasting and signalling information relevant to the plurality of mobile terminals 200, 200' that are located in a common coverage area, and the messages they transmit have an equal frame length.

Although the invention has been described in terms of a preferred embodiment described herein, those skilled in the art will appreciate other embodiments and modifications which can be made without departing from the scope of the teachings of the invention. All such modifications are intended to be included within the scope of the claims appended hereto.

The invention claimed is:

1. A method for performing a handover in a wireless communications system, the system comprising at least one mobile terminal, a plurality of base stations, at least one central entity managing the plurality of base stations, whereby the method comprises the steps of:
   the mobile terminal transmits a handover request message in a pre-assigned slot, requesting a new point of attachment;
   the plurality of base stations upon receiving the handover request message determine which one of the plurality of base stations is to become the new point of attachment;
   a base station upon completion of the determination on becoming the new point of attachment transmitting a handover response message to the mobile terminal;
   the mobile terminal upon reception of the handover response message changing its point of attachment; and
   the mobile terminal on receiving the handover response message, wherein the message lacks the MAC ID of the mobile terminal, maintains an original point of attachment.

2. A method according to claim 1, whereby the transmission of the handover request message is either a broadcast or a multicast transmission.

3. A method according to claim 1, whereby the transmission is done on a plurality of different sub-carriers.

4. A method according to claim 3, whereby all of the plurality of different sub-carriers are synchronized.

5. A method according to claim 1, whereby the pre-assigned slot is positioned towards the end of a transmitted frame.

6. A method according to claim 5, whereby the pre-assigned slot is positioned after a slot used for random access.

7. A method according to claim 1, whereby the handover request message comprises a MAC ID of the mobile terminal.

8. A method according to claim 1, whereby the base station transmits the handover response message in a broadcast or in a frame control channel.

9. A method according to claim 8, whereby the handover response message contains the MAC ID of the mobile terminal.

10. A method according to claim 1, whereby an OFDMA transmission scheme is used.

11. A method according to claim 1, whereby neighboring base stations of the plurality of base stations use a common frequency band for broadcasting and signaling information relevant to a plurality of mobile terminals located in a common coverage area.

12. A method according to claim 1, whereby the plurality of base stations transmit messages with an equal frame length.

13. A method according to claim 1, whereby the reception of the handover request message triggers an original point of attachment to plan a handover of a connection to the new point of attachment .

14. A method according to claim 13, whereby the connection comprises of transmitted data or link information.

15. A method according to claim 14, whereby the transmitted data further comprises of buffered data and the link information comprises of link contexts.

16. A method according to claim 15, whereby the link contexts comprises of quality of service requirements, security information, header compression information, and link layer information.

17. A mobile communications system, comprising at least one mobile terminal, a plurality of base stations, at least one central entity adapted to manage the plurality of base stations, adapted to perform a handover, wherein:

the mobile terminal is adapted to transmit a handover request message in a pre-defined slot requesting a new point of attachment;

the plurality of base stations are adapted to receive the handover request message and further adapted to determine which one of the plurality of base stations is to become the new point of attachment;

a base station arranged to become the new point of attachment is further adapted to transmit a handover response message to the mobile terminal;

the mobile terminal is adapted to receive the handover response message and to change its point of attachment; and the mobile terminal is further adapted to maintain an original point of attachment upon reception of the handover response message lacking the MAC ID.

18. A system according to claim 17, whereby the mobile terminal is further adapted to transmit the handover request message as a broadcast or as a multicast transmission.

19. A system according to claim 17, whereby the mobile terminal is further adapted to transmit the handover request message on a plurality of different sub-carriers.

20. A system according to claim 19, whereby the mobile terminal is further adapted to synchronize the plurality of different sub-carriers.

21. A system according to claim 17, whereby the mobile terminal is further adapted to position the pre-assigned slot towards the end of a transmitted frame.

22. A system according to claim 21, whereby the mobile terminal is further adapted to position the pre-assigned slot after a slot used for random access.

23. A system according to claim 17, whereby the mobile terminal is further adapted to form the handover request message comprising a MAC ID of the mobile terminal.

24. A system according to claim 17, whereby the base station is further adapted to transmit the handover response message in a broadcast or in a frame control channel.

25. A system according to claim 24, whereby the base station is further adapted to include the MAC ID of the mobile terminal in the transmitted handover response message.

26. A system according to claim 17 whereby the mobile terminal is further adapted to use an OFDMA transmission scheme.

27. A system according to claim 17, whereby neighboring base stations of the plurality of base stations are adapted to use a common frequency band for broadcasting and signaling information relevant to a plurality of mobile terminals located in a common coverage area.

28. A system according to claim 17, whereby the plurality of base stations are adapted to transmit messages with an equal frame length.

29. A system according to claim 17, whereby upon receiving the handover request message an original point of attachment is adapted to plan a handover of a connection to the new point of attachment.

* * * * *